US009415699B2

(12) United States Patent
Morioka et al.

(10) Patent No.: US 9,415,699 B2
(45) Date of Patent: Aug. 16, 2016

(54) ENERGY SYSTEM

(75) Inventors: Yukiko Morioka, Tokyo (JP); Hisato Sakuma, Tokyo (JP); Koji Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1201 days.

(21) Appl. No.: 13/388,540

(22) PCT Filed: Apr. 26, 2010

(86) PCT No.: PCT/JP2010/057351
§ 371 (c)(1),
(2), (4) Date: Feb. 2, 2012

(87) PCT Pub. No.: WO2011/016273
PCT Pub. Date: Feb. 10, 2011

(65) Prior Publication Data
US 2012/0133333 A1 May 31, 2012

(30) Foreign Application Priority Data

Aug. 4, 2009 (JP) ................................ 2009-181467
Dec. 16, 2009 (JP) ................................ 2009-285164

(51) Int. Cl.
*H02J 7/00* (2006.01)
*B60L 11/18* (2006.01)
(Continued)

(52) U.S. Cl.
CPC ......... *B60L 11/1862* (2013.01); *H01M 10/441* (2013.01); *H01M 10/482* (2013.01);
(Continued)

(58) Field of Classification Search
USPC ............................................... 320/101, 132
See application file for complete search history.

(56) References Cited

U.S. PATENT DOCUMENTS 6,133,707 A      10/2000  Kikuchi et al.
2006/0202857 A1*  9/2006  Kawahara .......... G01R 31/3624
                                               340/870.02
(Continued)

FOREIGN PATENT DOCUMENTS

JP       09-135536 A      5/1997
JP       2000-004545      1/2000
(Continued)

OTHER PUBLICATIONS

International Search Report in PCT/JP2010/057351 dated Aug. 3, 2010 (English Translation Thereof).
(Continued)

*Primary Examiner* — Robert Grant
(74) *Attorney, Agent, or Firm* — McGinn IP Law Group PLLC

(57) ABSTRACT

An energy system having a plurality of storage batteries and renewable power supplies includes an information processor. Each of the storage batteries is individually set to a maximum SOC representing a charging limit and a minimum SOC representing a discharging limit. Each of the storage batteries is chargeable and dischargeable under the control of an external device and is capable of measuring SOC values. The information processor controls charging and discharging processes of the storage batteries individually to keep the storage batteries charged until SOC values acquired from the storage batteries reach the maximum SOC when the storage batteries are charged and to keep the storage batteries discharged until SOC values acquired from the storage batteries reach the minimum SOC when the storage batteries are discharged.

9 Claims, 8 Drawing Sheets

(51) Int. Cl.
*H01M 10/44* (2006.01)
*H01M 10/48* (2006.01)
*H02J 7/34* (2006.01)
*H02J 3/38* (2006.01)

(52) U.S. Cl.
CPC ............... *H02J 3/383* (2013.01); *H02J 3/386* (2013.01); *H02J 7/007* (2013.01); *H02J 7/0014* (2013.01); *H02J 7/0016* (2013.01); *H02J 7/0021* (2013.01); *H02J 7/34* (2013.01); *Y02E 10/563* (2013.01); *Y02E 10/763* (2013.01); *Y10T 307/32* (2015.04)

(56) References Cited

U.S. PATENT DOCUMENTS

| | | | | |
|---|---|---|---|---|
| 2008/0211459 | A1* | 9/2008 | Choi | B60L 3/0046 320/134 |
| 2008/0224541 | A1* | 9/2008 | Fukuhara | 320/101 |
| 2009/0066287 | A1* | 3/2009 | Pollack et al. | 320/101 |
| 2009/0302681 | A1 | 12/2009 | Yamada et al. | |
| 2011/0156652 | A1* | 6/2011 | Kishiyama | B60L 11/1824 320/132 |
| 2011/0304295 | A1* | 12/2011 | McNally | 320/101 |

FOREIGN PATENT DOCUMENTS

| | | |
|---|---|---|
| JP | 2001-218368 A | 8/2001 |
| JP | 2002-044870 A | 2/2002 |
| JP | 2002-124302 A | 4/2002 |
| JP | 3360613 B2 | 12/2002 |
| JP | 3367382 B2 | 1/2003 |
| JP | 2003-199249 A | 7/2003 |
| JP | 2006-149061 A | 6/2006 |
| JP | 2006-204081 A | 8/2006 |
| JP | 2007-185008 A | 7/2007 |
| JP | 2007-244142 A | 9/2007 |
| JP | 2007-295718 A | 11/2007 |
| JP | 2008-125295 A | 5/2008 |
| JP | 2008-236821 A | 10/2008 |
| JP | 2009-005450 A | 1/2009 |

OTHER PUBLICATIONS

The Agency for Natural Resources and Energy, Handout 3 distributed from Research Group (2nd meeting) for low-carbon electric power supply systems, "About options for system stabilization measures", Aug. 8, 2008.

Mitsubishi Corporation, Press release on Jul. 1, 2008 "Start of the joint development of a charging infrastructure system for electric vehicles using renewable energy".

Rieti Discussion Paper Series 09-J-001 "Economic considerations about safeguards systems regarding costs for delivering, distributing, and storing renewable electric power", Dec. 2008.

Japanese Office Action dated Feb. 25, 2014, with partial English translation.

* cited by examiner

ENERGY SYSTEM

TECHNICAL FIELD

The present invention relates to an energy system including a renewable power supply linked to a power distribution system.

BACKGROUND ART

There has been sought widespread use of renewable power supplies that are capable of reducing the emission of greenhouse gases while in operation in order to achieve a sustainable society. In particular, solar cells are a renewable power supply that is most promising at present. One problem with the solar cells, however, is that their power output varies depending on the weather, or stated otherwise, the amount of electric energy generated thereby is unstable. Accordingly, if the number of solar power generation facilities that are linked to a power distribution system increases, then their unstable power generation capability is expected to adversely affect the power distribution system, causing problems referred to as "distributed voltage destabilization" and "supply-demand imbalance". There has been a concern in the art about these problems as they are liable to prevent renewable power supplies from finding widespread use, and demand has been increasing for finding a way to resolve these problems. The problems "distributed voltage destabilization" and "supply-demand imbalance", and solutions that have heretofore been proposed to solve these problems will be described below.

The problem "distributed voltage destabilization" is that the voltage (about 100 V) which is supplied to various electric power users including private houses, offices, autonomous facilities, etc. varies beyond an appropriate range due to the unstable amount of electric power generated by renewable power supplies. A voltage of about 6600 V sent from a power-distributing substation in a power distribution system is converted by the lowest-voltage transformer (hereinafter referred to as "terminal transformer") in the power distribution system into a voltage of about 100 V, which is supplied to electric power users. At this time, as current flows through power distribution lines having a limited resistance, the distribution voltage varies depending on the demand (electric power consumption). So far, demand has differed between daytime and nighttime, resulting in variations in the distribution voltage. However, the distribution voltage has been kept within an appropriate range of 101V±6V because changes in demand have been sufficiently small.

If the number of renewable power supplies that are linked to the power distribution system increases, then since the instability of the renewable power supplies is added to changes in demand, the distribution voltage tends to vary greatly beyond the appropriate range.

One existing technology for solving the problem "distributed voltage destabilization" is a process which uses a shutoff function that an inverter has. The inverter is a device for converting electric power generated by a renewable power supply into electric power that is compatible with a power distribution system. The inverter monitors the distribution voltage. When the distribution voltage approaches the upper limit of the appropriate range, the inverter breaks the linkage of the renewable power supply to the power distribution system, preventing the distribution voltage from rising.

The above process, however, leads to a reduction in the availability ratio of renewable power supplies as the number of renewable power supplies linked to the power distribution system grows, tending to waste the power generating capability of the renewable power supplies.

The problem "supply-demand imbalance" is that the demand and supply of electric power in an overall electric power system are brought out of balance as the number of renewable power supplies that are linked to the power distribution system increases. The overall electric power system needs to keep demand and supply of electric power in agreement with each other. Heretofore, the demand and supply of electric power have been kept in balance because the electric power company adjusts the amount of generated electric power depending on changes in the demand. Specifically, some electric generating stations that have an electric power demand-supply adjusting capability, such as thermal power stations, have played the adjusting role. An increase in the number of renewable power supplies that are linked to a power distribution system means an increase in the number of electric generating facilities which do not have an electric power demand-supply adjusting capability and whose generated electric power is unstable. Therefore, as the number of renewable power supplies that are linked to a power distribution system increases, the electric power demand-supply adjusting capability of the power distribution system weakens, making the frequency unstable and tending to cause large-scale blackout in a worse-case scenario.

An existing technology for solving the problem "supply-demand imbalance" is a process of increasing the number of thermal power stations that operate at a low availability ratio to increase the electric power demand-supply adjusting capability of an entire electric power system.

However, when thermal power stations operate at a low availability ratio, the cost of generating electric power increases because their power generating efficiency is low. Furthermore, increasing the number of thermal power stations contradicts to the purpose of reducing the emission of greenhouse gases by increasing the number of renewable power supplies.

As described above, no drastic solutions to the problems "distributed voltage destabilization" and "supply-demand imbalance" have been found in the art. For drastically solving the above problems, it is necessary to reduce the instability itself of renewable power supplies. As a way of reducing the instability of renewable power supplies, Patent documents 1 through 4 have proposed technologies for connecting a storage battery, which serves as a buffer for managing the instability of the amount of generated electric power, to the output of a renewable power supply.

In recent years, widespread use of storage batteries for use on vehicles has reduced the cost of storage batteries, and a process of linking storage batteries for use on vehicles to a power distribution system has been proposed (see Non-patent document 2), making it practical to install large-capacity storage batteries in private houses, etc. However, since storage batteries are still expensive, it is essential to lower the cost of storage batteries so that their usage can become widespread. Patent documents 1 through 4 do not discuss anything significant as regards lowering the cost of storage batteries.

For lowering the cost of storage batteries, it is necessary not only to reduce the manufacturing cost of storage batteries, but also to reduce the capacity of storage batteries used by respective electric power users but to increase the product life cycles of storage batteries (longer product life cycles). A reduction in the capacity of storage batteries realizes a reduction in the installation cost of storage batteries, and the longer product life cycles of storage battery realizes a reduction in the cost required for the maintenance of electric generating facilities which use storage batteries and renewable power supplies.

Efforts to achieve the "longer product life cycles" or "increased product life cycles" of storage batteries according to the present description mean efforts to prevent a reduction in the product life cycles of storage batteries owing to the operating process, but not efforts to prolong the product life cycles of storage batteries based on improved battery materials.

Processes that are presently proposed for reducing the capacity of storage batteries and making the product life cycles of storage batteries longer will be described below.

According to one process of reducing the capacity of storage batteries, a plurality of storage batteries are installed in a centralized area (centralized installation), rather than being installed at respective electric power users with power generation facilities (distributed installation). If storage batteries are installed in distributed locations, then the electric power users need to install storage batteries which have a sufficiently large capacity for individual charging and discharging demands thereof. Therefore, the total capacity of all the storage batteries belonging to the electric power users becomes large. If storage batteries are installed in a centralized area, then since the amounts of electric power to be charged into and discharged from the respective storage batteries even out because the demand of electric power from the electric power users and the supply of electric power to the electric power users cancel each other out, it is possible to reduce the total capacity of all the storage batteries and, as a result, to reduce the capacity of the storage battery belonging to each of the electric power users (Non-patent document 3).

However, the centralized installation of storage batteries (e.g., in each power-distributing substation) cannot solve the above problem "distributed voltage destabilization" because electric power generated by renewable power supplies is supplied via a power distribution system that charges the storage batteries and hence a number of electric generating facilities whose generated electric power is unstable are linked to the power distribution system.

The distributed installation of storage batteries reduces the effect of power generation instability on a power distribution system by managing the power generation instability with the storage batteries that are installed near renewable power supplies, though the distributed installation makes the total capacity of the storage batteries large. Consequently, the distributed installation of storage batteries is effective to assist in solving the problems "distributed voltage destabilization" and "supply-demand imbalance" of a power distribution system. Therefore, a technology for installing storage batteries in distributed locations, while at the same time reducing the total capacity of the storage batteries, is sought in environments where a number of electric generating facilities are linked to a power distribution system.

According to one process of prolonging the product life cycles of a storage battery the number of charging and discharging cycles is reduced. Generally, many types of storage batteries typified by a lithium ion battery have their capacity lowered as they are repeatedly charged and discharged. In order to prevent the product life cycles of a storage battery from being shortened, ro therefore, it is desirable for the storage battery not to be charged and discharged frequently repeatedly. In addition, inasmuch as it is known that the deterioration of a storage battery is accelerated if it is used in a high SOC (State Of Charge: the ratio of a charged amount of electric power to the capacity of the storage battery) range, it is desirable for the storage battery not to be used in a range of high SOCs (hereinafter referred to as "high SOC range"). Moreover, if a storage battery is kept in storage after it has been charged to a high SOC range, then the charged energy is wasted as the storage battery is self-discharged to a large degree in the short run, and the product life cycles of the storage battery is shortened as the storage battery is deteriorated in the long run.

For example, Patent document 5 and Patent document 6 disclose a technology wherein two storage batteries are provided for use on an electric vehicle, and while one of the storage batteries is being discharged, the other storage battery is charged, with their charging and discharging processes alternating with each other when necessary thereby reducing the number of charging and discharging cycles.

According to the technology disclosed in Patent document 5 and Patent document 6, however, the amount of electric power charged in a storage battery, which is to be switched from a charging cycle to a discharging cycle, may not necessarily have reached a sufficient level, and the amount of electric power stored in a storage battery, which is to be switched from a discharging cycle to a charging cycle, may not necessarily have reached a minimum level. Therefore, although the number of charging and discharging cycles can be made smaller than with a system not based on the technology disclosed in Patent document 5 and Patent document 6, the disclosed technology fails to sufficiently reduce the number of charging and discharging cycles of storage batteries.

Patent document 7 discloses a technology for not keeping a storage battery on a vehicle in storage after it has been charged to a high SOC range, by failing to charge the storage battery if it is expected that the vehicle will not be used for a long period of time.

Storage batteries on vehicles do not need to be operated if the vehicle is at rest. However, storage batteries used by electric power users including private houses, offices, autonomous facilities, etc. may store electric power generated by renewable power supplies and discharge stored electric power in response to a request from energy systems connected thereto, even in the absence of electric power users. Therefore, a need has arisen for a technology for operating a storage battery while at the same time not using a high SOC range as much as possible.

Generally, a storage battery made up of a plurality of storage cells or modules for increased battery capacity and output voltage suffers individual cell characteristic variations. Patent document 8 and Patent document 9 disclose a technology for reducing characteristic differences between cells at the time they are charged and discharged, thereby extending the product life cycles of the overall storage battery. However, the technology disclosed in Patent document 8 and Patent document 9 is unable to reduce the number of charging and discharging cycles of the individual cells though it can minimize a reduction in the product life cycles of the storage battery that results from the individual cell characteristic variations.

As described above, it is desirable to use storage batteries and install the storage batteries in distributed locations in order to lessen the problems "distributed voltage destabilization" and "supply-demand imbalance" which are caused by renewable power supplies, particularly solar cells, linked to a power distribution system.

However, the distributed installation of storage batteries tends to generate an increase in the capacity and cost of the storage batteries. As described above, in order to lower the cost of storage batteries, it is important to minimize a reduction of the capacity thereof while at the same time extending the product life cycles thereof.

RELATED ART LITERATURE

Patent Literature

Patent Literature 1: Japanese Patent Laid-Open No. 2007-185008.

Patent Literature 2: Japanese Patent Laid-Open No. 2006-204081.
Patent Literature 3: Japanese Patent Laid-Open No. 9-135536.
Patent Literature 4: Japanese Patent Laid-Open No. 2008-236821.
Patent Literature 5: Japanese Patent Laid-Open No. 2002-124302.
Patent Literature 6: Japanese Patent No. 3367382.
Patent Literature 7: Japanese Patent Laid-Open No. 2009-5450.
Patent Literature 8: Japanese Patent No. 3360613.
Patent Literature 9: Japanese Patent Laid-Open No. 2007-244142.
Non-Patent Literature
Non-patent Literature 1: The Agency for Natural Resources and Energy, Handout 3 distributed from Research Group (2nd meeting) for low-carbon electric power supply systems, "About options for system stabilization measures";
Non-patent Literature 2: Mitsubishi Corporation, Press release on Jul. 1, 2008 "Start of the joint development of a charging infrastructure system for electric vehicles using renewable energy";
Non-patent Literature 3: RIETI Discussion Paper Series 09-J-001 "Economic considerations about safeguards systems regarding costs for delivering, distributing, and storing renewable electric power".

SUMMARY

It is an exemplary object of the present invention to provide an energy system which will extend the product life cycles of a storage battery while minimizing an increase in the capacity of the storage battery in order to thereby contribute to a reduction in the cost of the storage battery.

To achieve the above object, there is provided in accordance with an exemplary aspect of the present invention an energy system comprising:

an electric device that consumes electric power;

a plurality of storage batteries that supplies stored electric power to the electric device, each of the storage batteries being individually set to a maximum SOC representing a charging limit and a minimum SOC representing a discharging limit, each of the storage batteries being chargeable and dischargeable under the control of an external device and being capable of measuring SOC values;

a renewable power supply that supplies generated electric power to the electric device and the storage batteries; and an information processor that controls charging and discharging processes of the storage batteries individually to keep the storage batteries charged until SOC values acquired from the storage batteries reach the maximum SOC when the storage batteries are charged and to keep the storage batteries discharged until SOC values acquired from the storage batteries reach the minimum SOC when the storage batteries are discharged.

EXEMPLARY EMBODIMENT

The present invention will be described below with reference to the drawings.

First Exemplary Embodiment

Figure 1:
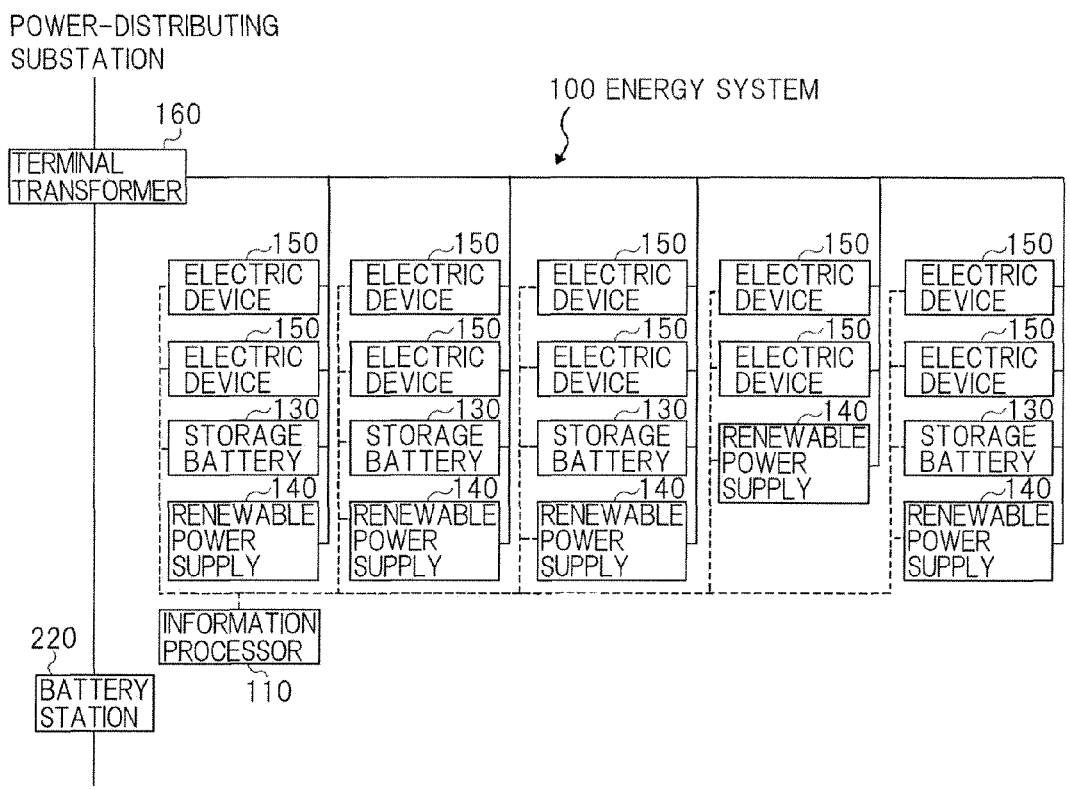
FIG. 1 is a block diagram of a configurational example of an energy system according to a first exemplary embodiment of the present invention.

FIG. 1 is a block diagram of a configurational example of an energy system according to a first exemplary embodiment of the present invention.

As shown in FIG. 1, energy system 100 according to the first exemplary embodiment includes electric devices 150 that consume electric power, which are owned by respective electric power users, renewable power supplies 140 such as solar cells or the like, storage batteries 130 that store electric power, and information processor 110 that controls the charging and discharging of storage batteries 130. Energy system 100 is constructed in association with each terminal transformer 160 which distributes electric power delivered from a power-distributing substation, for example, to electric power users.

Renewable power supplies 140 and storage batteries 130 are installed in distributed locations at the facilities of respective electric power users, for example. In energy system 100 according to the present exemplary embodiment, a plurality of renewable power supplies 140 and a plurality of storage batteries 130 that are installed in distributed locations are shared by the electric power users.

Electric devices 150 of the respective electric power users are supplied with electric power from a power distribution system via outlets that the electric power users (houses and facilities) have, and are also supplied with electric power that is generated by renewable power supplies 140 and electric power that is stored in storage batteries 130.

Storage batteries 130 store electric power supplied from the power distribution system or electric power generated by renewable power supplies 140.

Renewable power supplies 140 supply generated electric power to electric devices 150 and storage batteries 130 which the respective electric power users have. If there is excessive electric power that is not used in energy system 100, then renewable power supplies 140 supply the excessive electric power to the power distribution system (reverse power flow).

Information processor 110 is connected to electric devices 150, renewable power supplies 140, and storage batteries 130 by respective communication lines. Information processor 110 receives, via the communication lines, the amount of electric power consumed by the respective electric power users, the amount of electric power generated by respective renewable power supplies 140, and the inherent information (to be described later) of respective storage batteries 130. Information processor 110 controls the amount of electric power generated by respective renewable power supplies 140 and the charging and discharging of storage batteries 130 based on the received information.

Energy system 100 shown in FIG. 1 may include battery station 220 for changing vehicular storage batteries mounted on electric vehicles, plug-in hybrid vehicles, etc. and charging those vehicular storage batteries. Battery station 220 may have an electric power demand-supply adjusting capability. The electric power demand-supply adjusting capability of battery station 220 can be realized by, for example, providing battery station 220 with a number of storage batteries 130 and controlling the charging and discharging storage batteries 130.

(1) Electric Power User:

An electric power user is a facility which uses electric power, having a plurality of electric devices 150, storage battery 130, and renewable power supply 140, such as a private house, an office, an autonomous facility, etc. Energy system 100 shown in FIG. 1 includes electric power users each having renewable power supply 140 or storage battery 130, and electric power users having neither renewable power supply 140 nor storage battery 130.

(2) Storage Battery and Renewable Power Supply:

Storage batteries 130 included in energy system 100 shown in FIG. 1 may be stationary storage batteries and vehicular storage batteries referred to above. Storage batteries are connected to the power distribution system through outlets of electric power users (houses and facilities) and battery station 220, for example.

Each of storage batteries 130 may be a lithium ion secondary battery, for example, set to a maximum SOC(State Of Charge: the ratio of a charged amount of electric power to the capacity of the storage battery) which represents a charging limit, and a minimum SOC which represents a discharging limit.

An SOC is calculated as the amount of electric power charged or discharged with respect to a nominal capacity that is released by the manufacturer or seller of storage batteries 130. When a storage battery is charged to the nominal capacity, its SOC is 100%. An SOC is also calculated as the amount of electric power charged or discharged with respect to a fully charged capacity, i.e., a state wherein storage battery 130, immediately after it is shipped from the factory, is fully charged according to a charging process indicated by the manufacturer or seller of storage batteries 130 (using a genuine charger, etc.). When a storage battery is charged to its fully charged capacity, its SOC is 100%. If the state wherein storage battery 130 is fully charged according to the charging process indicated by the manufacturer or seller of storage batteries 130 is defined as SOC 100%, then since use of the storage battery generally causes a deterioration in its capacity, its SOC will not subsequently be 100% even when it is fully charged. Therefore, when the number of charging and discharging cycles carried out has reached a certain count, a full charge and a partial discharge process, that may be performed for every 100 charge/discharge cycles, for example, is carried out, thereby periodically calibrating the capacity for SOC 100%.

The values of the maximum SOC and the minimum SOC are individually established by the manufacturer or seller of storage batteries 130, for example, by taking into consideration the range in which storage batteries 130 can be stably used. The maximum SOC may be 100% or a value lower than 100%. The minimum SOC may be 0% or a value higher than 0%. The value of the maximum SOC may be changed depending on the degree to which storage batteries 130 are deteriorate, as described above.

Each storage battery 130 is combined with a known storing device (not shown) for storing electric power generated by renewable power supply 140 or electric power supplied from the power distribution system, a known current and voltage regulator (not shown) for controlling the current and voltage at the time it is charged and discharged, and a known SOC measuring device (not shown) for measuring values of SOCs. The storing device and the current and voltage regulator can be controlled by information processor 110, and measured results produced by the SOC measuring device can be retrieved by information processor 110.

Renewable power supplies 140 to be controlled may be solar cells, wind power generators, etc., for example. Each renewable power supply 140 is combined with an inverter (not shown) for making electric power generated thereby compatible with the power distribution system.

(3) Information Processor:

Information processor 110 retrieves the amounts of electric power consumed by the respective electric power users, the amounts of electric power generated by respective renewable power supplies 140, and the inherent information (to be described later) of respective storage batteries 130, and controls the charging and discharging of storage batteries 130 in energy system 100 based on the retrieved information. Information processor 110 may control only the charging and discharging of storage batteries 130, or may control energy system 100 in its entirety which includes storage batteries 130, renewable power supplies 140, electric devices 150, battery station 220, etc.

Figure 2:
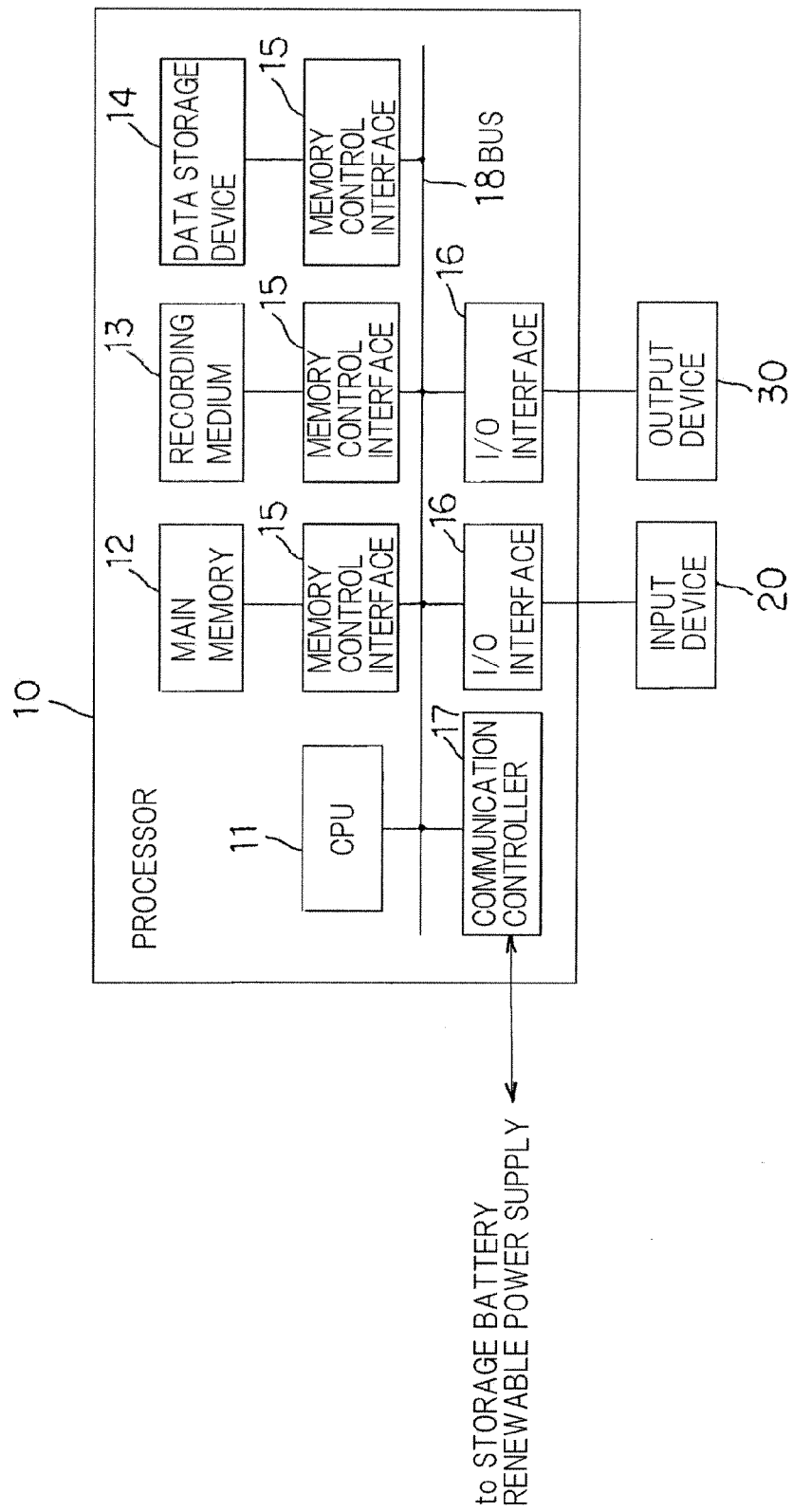
FIG. 2 is a block diagram of a configurational example of an information processor shown in FIG. 1.

Information processor 110 may be implemented by a computer as shown in FIG. 2, for example.

The computer shown in FIG. 2 has processor 10 for performing certain processing sequences according to programs, input device 20 for inputting commands, information, etc. to processor 10, and output device 30 for outputting processed results from processor 10.

Processor 10 includes CPU 11, main memory 12 for temporarily holding information required for processing sequences carried out by CPU 11, recording medium 13 which records therein programs for controlling CPU 11 to perform processing sequences according to the present invention, data storage device 14 for storing inherent information representing rated capacities, maximum SOCs, minimum SOCs, and output voltages of respective storage batteries 130, information representing the amounts of electric power consumed by the respective electric power users, memory control interfaces 15 for controlling data transfer between main memory 12, recording medium 13, and data storage device 14, I/O interfaces 16 serving as interface devices for input device 20 and output device 30, and communication controller 17 for sending information to and receiving information from the electric power users, storage batteries 130, renewable power supplies 140, etc. These components are connected by bus 18.

Processor 10 performs processing sequences for controlling the charging and discharging of storage batteries 130 in energy system 100 according to the programs recorded in recording medium 13. Recording medium 13 may be a magnetic disk, a semiconductor memory, an optical disk, or any of other recording mediums. Data storage device 14 does not need to be included in processor 10, but may be an independent device.

The amount of electric power consumed by the electric power users can be measured by electric power meters installed in houses, facilities, etc. Alternatively, the amount of electric power consumed by electric power users may be measured by known electric power measuring devices installed on power distribution boards, or may be measured by integrating power values measured by known electric power measuring devices installed on power outlets and electric devices 150. Information processor 110 may accumulate the measured amount of consumed electric power in association with information representing time, temperature, dates, etc. and may use the accumulated information for predicting the amount of electric power which will be consumed.

The amount of electric power generated by renewable power supplies 140 can be measured by known electric power measuring devices that are connected to the output terminals of renewable power supplies 140. The amount of electric power generated by renewable power supplies 140 can be controlled based on the number of cells or modules used for solar power generation, or can be controlled based on the angle of blades (rotary blades) used for wind power generation. The amount of electric power generated by renewable power supplies 140 can also be controlled by consuming electric power using resistors or the like.

The inherent information of storage batteries 130 may represent rated capacities, maximum SOCs, minimum SOCs, output voltages, etc. These items of information may be stored in information processor 110 in advance or may be sent from storage batteries 130 to information processor 110.

With energy system 100 shown in FIG. 1, storage batteries 130 may not necessarily be charged or discharged continuously. According to the present exemplary embodiment, therefore, information indicating whether each storage battery 130 is designated as belonging to a charging storage battery group or to a discharging storage battery group will be described later, and measured SOC values are included in the inherent information. These items of information may be managed by information processor 110 or may be sent from storage batteries 130 to information processor 110.

Information processor 110 may store the numbers of charging and discharging cycles of respective storage batteries 130 and accumulated times over which storage batteries 130 have been used, and may determine charging or discharging instructions for respective storage batteries 130 for respective storage batteries 130 by taking into consideration expected deteriorations in the performance of storage batteries 130. For example, if the number of charging and discharging cycles exceeds a preset count or if the accumulated time for charging/discharging a storage battery exceeds a preset time, then information processor 110 may change the values of the maximum SOC and the minimum SOC. Information processor 110 may determine the state of deterioration in the storage capacity of storage batteries 130 based upon a change in the open voltage and a change in the impedance while storage batteries 130 are being charged and discharged, and may change the maximum current values when storage batteries 130 are charged and discharged.

Figure 3:
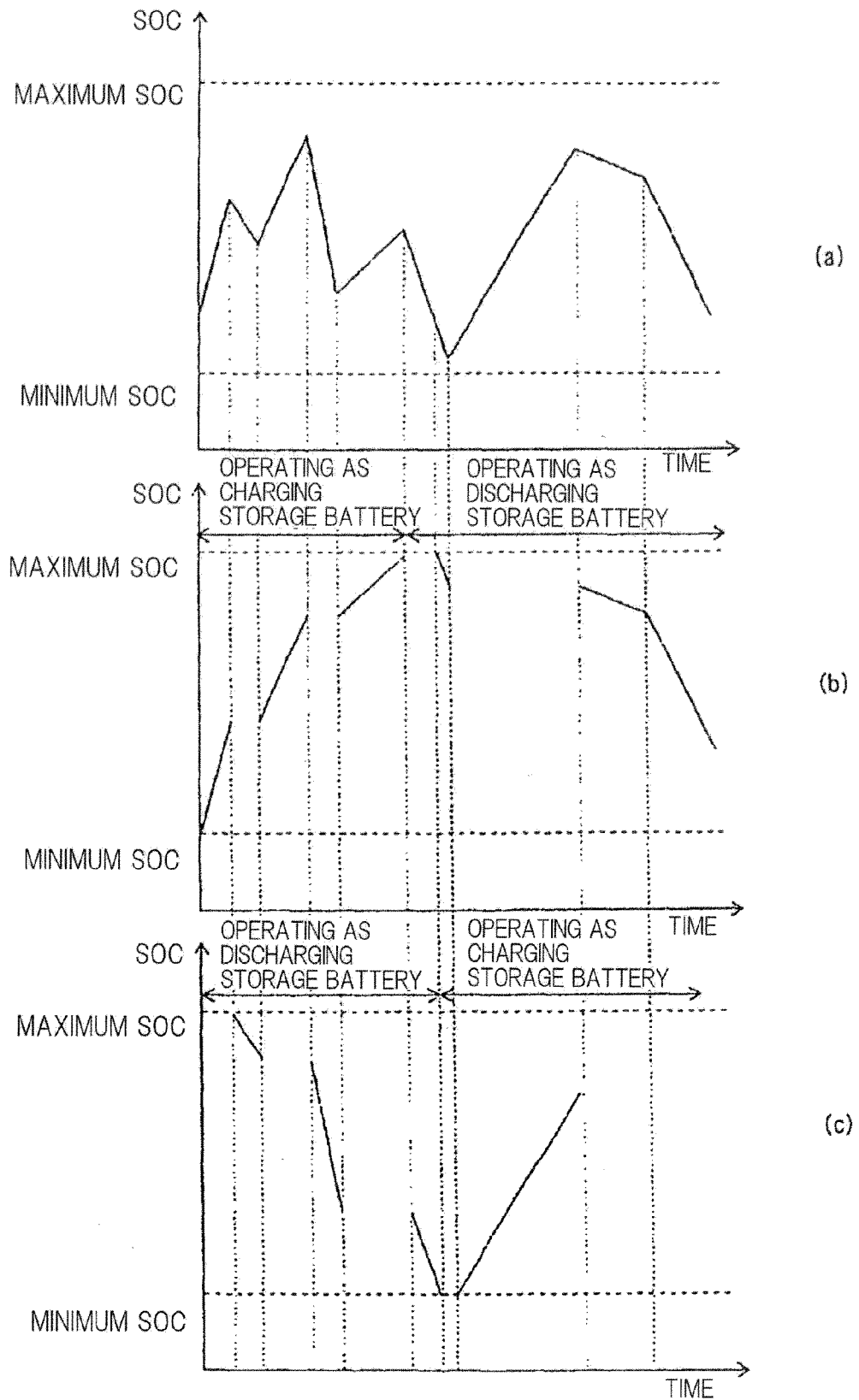
FIG. 3 is a diagram illustrative of a method of controlling the charging and discharging of a storage battery, which is carried out by the information processor according to the first exemplary embodiment.

(4) Algorithm:

With energy system 100 shown in FIG. 1, the amount of electric power consumed by each electric power user is constant, but varies with time. Consequently, if storage batteries 130 are charged or discharged depending on variations in the amount of consumed electric power, as shown in FIG. 3(a), then the number of charging and discharging cycles of storage batteries 130 increases, and the product life cycles of storage batteries 130 decreases.

With energy system 100 shown in FIG. 1, furthermore, storage batteries 130 are installed in distributed locations, and the time when each storage battery 130 is added to energy system 100, the time when it is removed from energy system 100, the value of an SOC at the time it is added to energy system 100, the history of charging and discharging cycles, the maximum SOC, the minimum SOC, the storage battery capacity, and the characteristics differ (vary) from storage battery 130 to storage battery 130.

According to the present exemplary embodiment, storage batteries 130 in energy system 100 are classified into a charging storage battery group and a discharging storage battery group. Storage batteries 130 that are designated belonging to the charging storage battery group are continuously charged until they reach a maximum SOC based on the values of SOCs acquired from those storage batteries 130. Storage batteries 130 that are designated belonging to the discharging storage battery group are continuously discharged until they reach a minimum SCO based on the values of SOCs acquired from those storage batteries 130. According to the present exemplary embodiment, in other words, information processor 110 individually controls the charging and discharging of storage batteries 130 in energy system 100, and switches the charging and discharging of each of storage batteries 130 at the maximum SOC or the minimum SOC.

If each storage battery 130 is made up of a plurality of storage battery packs each controllable for charging and discharging, or if each storage battery 130 is made up of a plurality of modules or cells each controllable for charging and discharging, then each storage battery pack, each module, or each cell may be controlled.

Since the amount of consumed electric power in energy system 100 vary with time, as described above, energy system 100 according to the present exemplary embodiment may not necessarily be able to continuously charge storage batteries 130 that are designated as belonging to the charging storage battery group and may not necessarily be able to continuously discharge storage batteries 130 that are designated as belonging to the discharging storage battery group.

For example, as shown in FIG. 3(b), storage batteries 130 that are designated as belonging to the charging storage battery group are discontinuously charged up to respective maximum SOCs set depending on the amount of consumed electric power in energy system 100. When those storage batteries 130 are charged up to their maximum SOCs, they are individually designated as belonging to the discharging storage battery group, and thereafter discontinuously discharged.

As shown in FIG. 3(c), storage batteries 130 that are designated as belonging to the discharging storage battery group are discontinuously discharged up to respective minimum SOCs set depending on the amount of consumed electric power in energy system 100. When those storage batteries 130 are discharged up to their minimum SOCs, they are individually designated as belonging to the charging storage battery group, and thereafter discontinuously charged.

As described above, information processor 110 according to the present exemplary embodiment individually controls the charging and discharging of storage batteries 130 in energy system 100, and controls the amount of electric power generated by renewable power supplies 140 and the amount of electric power which energy system 100 receives from the power distribution system, depending on the amount of electric power consumed in energy system 100.

Figure 4:
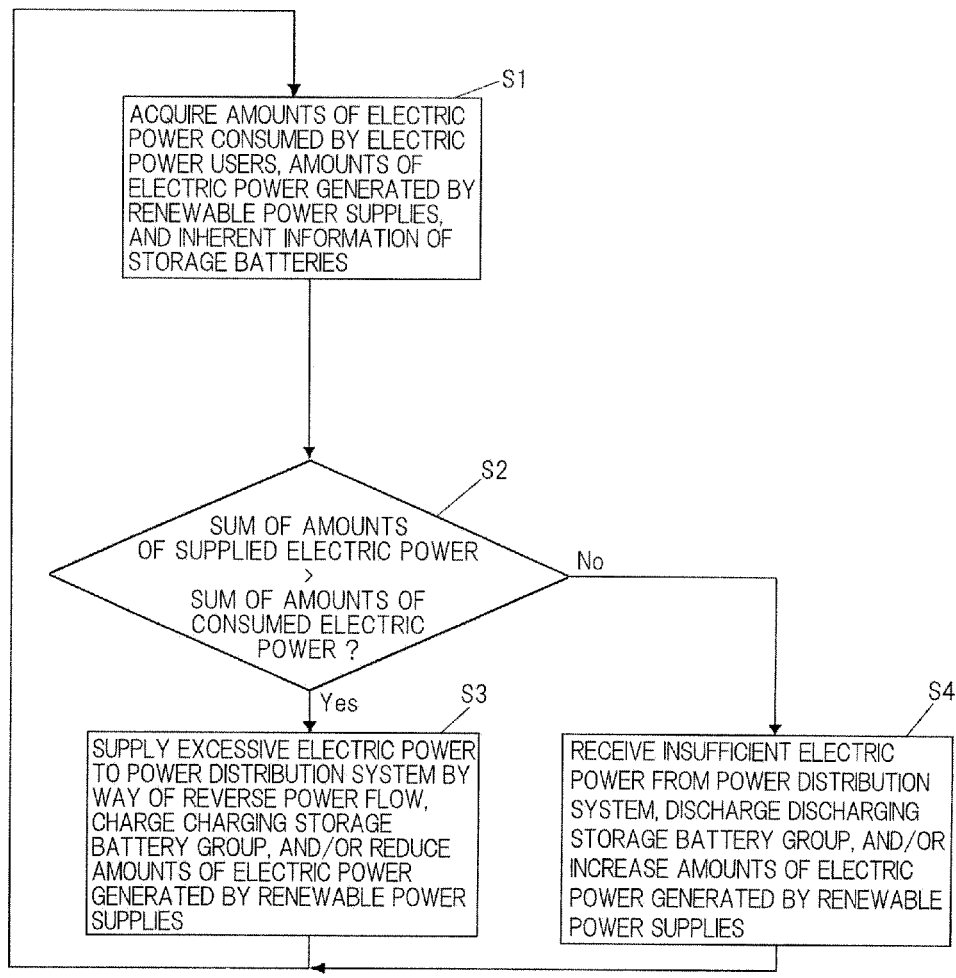
FIG. 4 is a flowchart of a sequence for controlling the amount of consumed electric power and the amount of supplied electric power, which is carried out by the information processor according to the first exemplary embodiment.

FIG. 4 is a flowchart of a sequence for controlling the amount of consumed electric power and the amount of supplied electric power, which is carried out by the information processor according to the first exemplary embodiment.

As shown in FIG. 4, information processor 110 acquires the amount of electric power consumed by the respective electric power users, the amount of electric power generated by respective renewable power supplies 140, and the inherent information of respective storage batteries 130 (step S1).

Then, information processor 110 compares the sum of the amounts of electric power supplied by respective renewable power supplies 140 in energy system 100 that is managed by information processor 110, and the sum of the amounts of electric power consumed by respective electric devices 150 with each other, and determines whether the sum of the amounts of supplied electric power is greater than the sum of the amounts of consumed electric power or not (step S2).

If the sum of the amounts of supplied electric power is greater than the sum of the amounts of consumed electric power, then information processor 110 carries out at least one of the following alternatives (a) through (c) (step S3):

(a) Information processor 110 supplies excessive electric power as the difference produced by subtracting the sum of the amounts of consumed electric power from the sum of the amounts of supplied electric power to the power distribution system by way of reverse power flow.

(b) Information processor 110 charges storage batteries 130 designated as belonging to the charging storage battery group.

(c) Information processor 110 reduces the amounts of electric power generated by renewable power supplies 140.

At this time, for effectively using renewable power supplies 140, it is desirable for information processor 110 (a) to supply excessive electric power to the power distribution system by way of reverse power flow or (b) to charge storage batteries 130 designated as belonging to the charging storage battery group, rather than to reduce the amount of electric power generated by renewable power supplies 140.

If the sum of the amounts of supplied electric power is smaller than the sum of the amounts of consumed electric power, then information processor 110 carries out at least one of the following alternatives (d) through (f) (step S4):

(d) Information processor 110 receives an amount of electric power that is insufficient as the difference produced by subtracting the sum of the amounts of supplied electric power from the sum of the amounts of consumed electric power from the power distribution system.

(e) Information processor 110 discharges storage batteries 130 designated as belonging to the discharging storage battery group.

(f) Information processor 110 increases the amounts of electric power generated by renewable power supplies 140.

At this time, to reduce the number of charging and discharging cycles of storage batteries 130 and to effectively use renewable power supplies 140, it is desirable that information processor 110 (d) receive an amount of electric power from the power distribution system that is insufficient, or (f) to increase the amount of electric power generated by renewable power supplies 140 rather than (e) to increase the amount of electric power generated by renewable power supplies 140.

According to the above control sequence, information processor 110 compares the sum of the amounts of supplied electric power and the sum of the amounts of consumed electric power in energy system 100 that is managed by information processor 110 with each other in step S2. However, if electric power to be supplied from an external source to the power distribution system by way of reverse power flow or if electric power to be received from the power distribution system is notified, then information processor 110 may control the amount of supplied electric power and the amount of consumed electric power in energy system 100 according to the indication.

Figure 5:
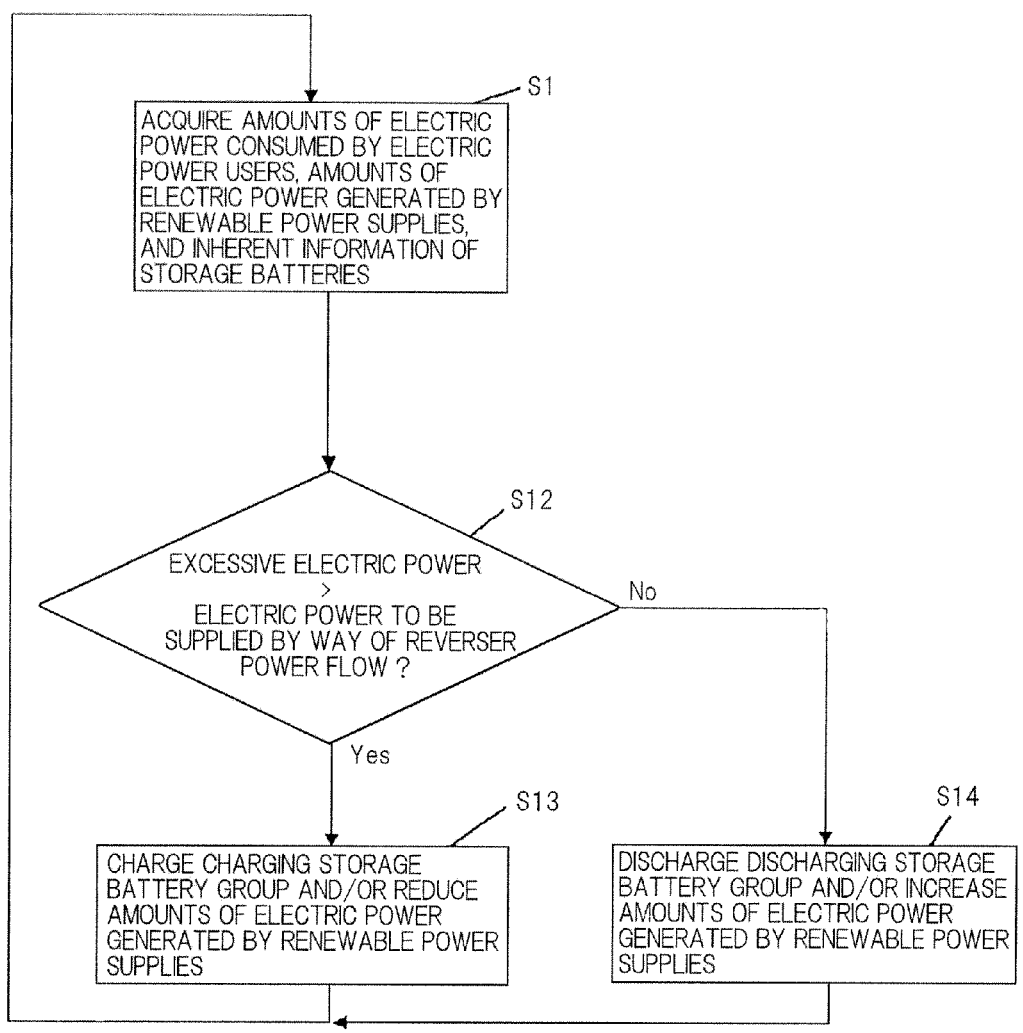
FIG. 5 is a flowchart of another sequence for controlling the amount of consumed electric power and the amount of supplied electric power, which is carried out by the information processor according to the first exemplary embodiment.

For example, if an amount of electric power to be supplied to the power distribution system by way of reverse power flow is notified, then, as shown in FIG. 5, information processor 110 may carry out step S1 and thereafter compare the amount of excessive electric power in energy system 100 and the amount of electric power to be supplied to the power distribution system by way of reverse power flow with each other (step S12). If the amount of excessive electric power is greater than the amount of electric power to be supplied to the power distribution system by way of reverse power flow, then information processor 110 carries out at least one of (b) and (c) described above (step S13). If the amount of excessive electric power is smaller than the amount of electric power to be supplied to the power distribution system by way of reverse power flow, then information processor 110 carries out at least one of (e) and (f) described above (step S14).

Figure 6:
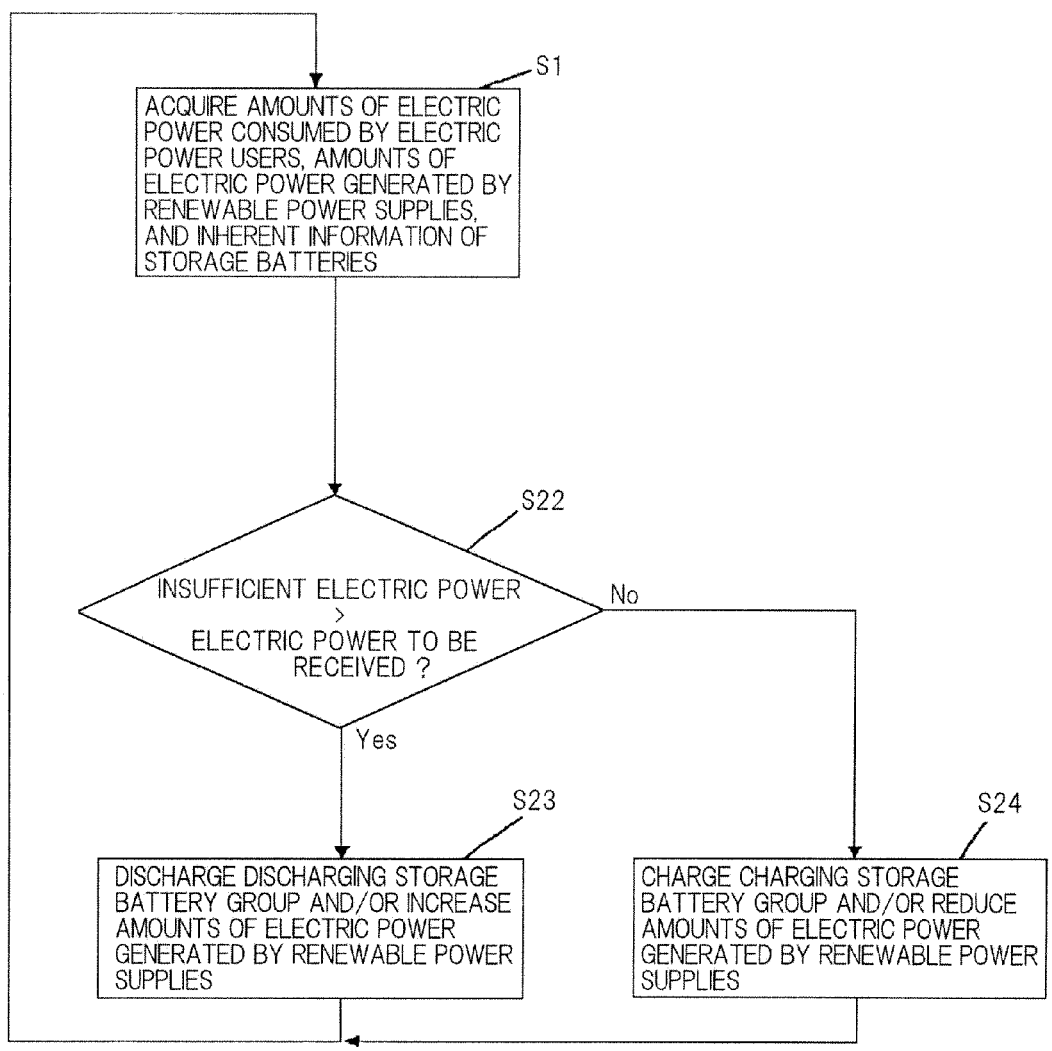
FIG. 6 is a flowchart of still another sequence for controlling the amount of consumed electric power and the amount of supplied electric power, which is carried out by the information processor according to the first exemplary embodiment.

If an amount of electric power to be received from the power distribution system is indicated, then, as shown in FIG. 6, information processor 110 may carry out step S1 and thereafter compare that amount of electric power in energy system 100 that is insufficient and the amount of electric power to be received from the power distribution system with each other (step S22). If the amount of the electric power that is insufficient is greater than the amount of electric power to be received from the power distribution system, then information processor 110 carries out at least one of (e) and (f) described above (step S23). If the amount of the electric power that is insufficient is smaller than the amount of electric power to be received, then information processor 110 carries out at least one of (b) and (c) described above (step S24).

Furthermore, if an amount of electric power that is to be obtained by charging is smaller than the amounts of electric power that can be obtained by charging all storage batteries 130 that are designated as belonging to the charging storage battery group, or an amount of electric power to be discharged is smaller than the amounts of electric power that can be discharged by all storage batteries 130 that are designated as belonging to the discharging storage battery group, then a priority sequence may be given in advance to storage batteries 130 in the charging storage battery group and the discharging storage battery group, and storage batteries 130 to be charged or discharged may be selected according to the priority sequence.

For example, a priority sequence given to the charging storage battery group may be such that storage battery 130 of minimum SOC is set to the highest priority, then storage batteries 130 belonging to the charging storage battery group which has not reached maximum SOC may be set to higher priorities according to the ascending order of SOC values, and finally storage batteries 130 may be set to higher priorities according to the ascending order of the numbers of charging and discharging cycles.

A priority sequence may be given to storage batteries 130 belonging to the charging storage battery group so as not to use storage batteries 130 in a high SOC range. For example, if an amount of electric power to be charged is sufficiently smaller than the amounts of electric power that can be charged by storage batteries 130, then storage batteries 130 belonging to the charging storage battery group may individually be set to a charging-stop SOC, which serves as an index for stopping the charging process, lower than the maximum SOC, and, when those storage batteries are charged up to the charging-stop SOC, they may stop being charged and may be designated as belonging to the discharging storage battery group, so that the storage batteries will not be used in the high SOC range. The charging-stop SOC has a maximum value that is equal to the value of the maximum SOC established for each of the storage batteries.

Furthermore, the storage batteries designated as belonging to the charging storage battery group may individually be set to a charging-stop ratio in an SOC range between the maximum SOC and the minimum SOC (hereinafter referred to as "usable SOC range"), and when the storage batteries are charged up to the charging-stop ratio, they may stop being charged and may be designated as belonging to the discharging storage battery group, so that the storage batteries will not be used in the high SOC range. The charging-stop ratio is a utilization ratio within the usable SOC range, which serves as an index for stopping the charging process. The utilization ratio within the usable SOC range is a value indicating how much percentage a storage battery is charged up to 100% as the usable SOC range. For example, if the usable SOC range is established between a maximum SOC of 90% and a minimum SOC of 10%, then the utilization ratio of 70% within the usable SOC range means that a storage battery is charged up to 70% of the usable SOC range which is represented as 100. Stated otherwise, within the interval 80% from the SOC of 10% to the SOC of 90%, the storage battery is charged with an amount of electric power indicated as 80×0.7=56%, which is expressed as an SOC of 66%.

Storage batteries 130 which have already exceeded the charging-stop SOC or the charging-stop ratio at the time it is established may be designated as belonging to the discharging storage battery group when they are detected as exceeded the charging-stop SOC or the charging-stop ratio. The values of the charging-stop SOC and the charging-stop ratio may be determined depending on the state of the energy system based on the amount of electric power that can be obtained by charging respective storage batteries 130 and based on the amount of electric power that is to be obtained by charging respective storage batteries 130. The values of the charging-stop SOC and the charging-stop ratio may not only be real-time values representing amounts of consumed electric power, but may also be predicted based on the results of learning processes for learning the amounts of electric power consumed in the energy system depending on seasons, weathers, dates, time zones, etc. and the occurrence tendency of instructions for reverse power flow to the power distribution system and charging instructions depending on seasons, weathers, dates, time zones, etc.

A priority sequence given to the discharging storage battery group may be such that storage battery 130 having a minimum SOC is set to the highest priority, then storage batteries 130 belonging to the discharging storage battery group and which have not reached the minimum SOC may be set to higher priorities according to the descending order of SOC values, and finally storage batteries 130 may be set to higher priorities according to the descending order of the numbers of charging and discharging cycles. Storage batteries 130 within the usable SOC range may be set to higher priorities according to the descending order of utilization ratios.

In order to minimize the use of the storage batteries designated as belonging to the discharging storage battery group, it is desirable not only to discharge a storage battery that has a high priority, but also to discharge a plurality of storage batteries successively from higher priorities at the same time. For example, a storage battery having priority 1, which is the highest priority, may be discharged, and if the value of the SOC of the storage battery having priority 1 is the same as the value of the SOC of a storage battery having priority 2, which is the second highest priority, or if the utilization ratio within the usable SOC range of the storage battery having priority 1 is the same as the utilization ratio of the storage battery having priority 2, then the storage batteries having priority 1 and priority 2 may be discharged concurrent with each other. Similarly, at the time when the value of the SOC of the storage battery having priority 1 is the same as the value of the SOC of a storage battery having priority 3, which is the third highest priority, or falls in the usable SOC range, if there is a storage battery having priority 3 which is of the same utilization ratio, then storage batteries having priority 1, priority 2, and priority 3 may be discharged concurrent with each other.

It is said that lithium ion batteries, particularly storage batteries having a positive electrode material of manganese spinel, self-discharge to a large degree not only in the high SOC range, but also if kept in storage with a discharging voltage in the vicinity of 3.7 V. Therefore, storage batteries having a positive electrode material of manganese spinel should be set to a high priority regardless of whether they are designated as belonging to the charging storage battery group or the discharging storage battery group so that they will not be kept in storage with a discharging voltage of 3.7 V.

As a specific example wherein storage batteries 130 will not be used in a high SOC range, the following process may be considered:

Based on the amount of electric power consumed in the energy system, the amount of electric power generated by the renewable power supplies, instructions for reverse power flow to the power distribution system, and instructions for receiving electric power from the power distribution system, seasons, weathers, dates, time zones, etc., the amount of electric power to be charged (a, unit: W) and the amount of electric power to be discharged (b, unit: W) in the energy system are predicted within a predetermined period (predicted period).

A value x (unit: %) of the charging-stop SOC is established such that the relationship between capacity A=at (unit: Wh) to be charged in the energy system in the predicted period (t, unit: h) and sum C (unit: Wh) of idle capacities of storage batteries whose SOC is equal to or smaller than x % satisfies A≤C.

If it is assumed that the sum of the amounts of electric power that have already been obtained by charging storage batteries 130 designated as belonging to the charging storage battery group is represented by D (unit: Wh) and the total capacity of storage batteries 130 designated as belonging to the charging storage battery group is represented by E (unit: Wh), then the value x of the charging-stop SOC may be expressed by an average SOC ((D+A)/E×100) of the storage batteries designated as belonging to the charging storage battery group after they are charged to capacity A. If the charging storage battery group includes storage batteries whose SOC value exceeds x %, then those storage batteries are designated as belonging to the discharging storage battery group. If there are storage batteries whose SOC value exceeds the average SOC of the charging storage battery group when they are charged to capacity A, then the same calculations as those described above may be carried out except for those storage batteries to determine a more appropriate value x. If the predicted time is set to a value shorter than 30 minutes, then since the value x of the charging-stop SOC is changed frequently, the value x of the charging-stop SOC may be set to a value greater than the average SOC.

In order not to use storage batteries 130 in the high SOC range, it is desirable to set the value x of the charging-stop SOC to as small a value as possible. However, if the value x of the charging-stop SOC is reduced, the charging and discharging processes are frequently switched, tending not only to generate a reduction in the capacities of storage batteries 130 but also to impose an increased processing burden on information processor 110. Accordingly, the value x of charging-stop SOC should desirably be 20 or higher.

According to a process of simply establishing a value of the charging-stop SOC, values at certain intervals, e.g., x=40, 50, 60, 70, for example, are established as candidates, and one of them is selected based on the relationship between the amounts of electric energy that can be obtained by charging the storage batteries designated as belonging to the charging storage battery group and the amounts of electric energy that are to be obtained from the energy system whose storage batteries have been charged. This process can reduce the processing burden on the information processor.

If energy system 100 includes a vehicular storage battery, then there may be considered a process of preferentially charging the vehicular storage battery to meet a date on which it is to be used that is established by the user of a vehicle, and thereafter charging storage batteries 130 designated as belonging to the charging storage battery group.

Storage batteries 130 in energy system 100 should preferably be controlled individually for their charging and discharging. However, storage batteries 130 having similar charging and discharging characteristics may be divided into a group, and the timings to charge and discharge those storage batteries may be controlled in the group. According to this process, the processing burden on the information processor can be reduced.

With the energy system according to the present exemplary embodiment, electric power users share renewable power supplies 140 and storage batteries 130 in energy system 100, and information processor 110 controls the amount of electric power generated by renewable power supplies 140 and the charging and discharging of storage batteries 130, so that storage batteries 131 installed in distributed locations can be utilized in the same manner as with storage batteries installed in a centralized area. Consequently, the total capacity of storage batteries 130 in energy system 100 can be reduced to the same level as with the centralized storage batteries.

Information processor 110 individually controls the charging and discharging processes of storage batteries 130 in energy system 100, and controls each of storage batteries 130 to keep them discharged until they reach the minimum SOC and also controls each of storage batteries 130 to keep them charged until they reach the maximum SOC, the charging-stop SOC, or the charging-stop ratio. In this manner, the number of charging and discharging cycles of each storage battery 130 is reduced maximally.

Accordingly, the cost of storage batteries 130 can be lowered since the capacity of storage batteries 130 is prevented from increasing and the product life cycles of storage batteries 130 is prevented from being shortened.

Second Exemplary Embodiment

As with the first exemplary embodiment, an energy system according to a second exemplary embodiment controls storage batteries 130 and renewable power supplies 140, and also controls the supply of electric power to electric devices 150. The configuration of energy system 100 is identical to the configuration of energy system 100 according to the first exemplary embodiment shown in FIG. 1, and will not be described below.

Electric devices 150 to be controlled by information processor 110 according to the present exemplary embodiment are devices that can be temporarily shut down under the control of an external device and that do not lose their convenience when they are shut down, such as heat-pump electric water heaters, air conditioners, refrigerators, etc., for example.

Information processor 110 according to the present exemplary embodiment reduces the amount of consumed electric power by stopping supplying electric power to electric devices 150 to be controlled, instead of or concurrent with discharging storage batteries 130 designated as belonging to the discharging storage battery group, if the sum of the amounts of supplied electric power in energy system 100 is smaller than the sum of the amounts of consumed electric power.

If the sum of the amounts of supplied electric power is greater than the sum of the amounts of consumed electric power, then information processor 110 supplies any of electric devices 150 that have been shut down with electric power to operate them, thereby increasing the amount of consumed electric power.

As with the first exemplary embodiment, if the amount of electric power to be supplied from an external source to the power distribution system by way of reverse power flow is notified and if excessive electric power is smaller than the amount of electric power to be supplied by way of reverse power flow, or if the amount of electric power to be received from the power distribution system is notified and the amount of electric power that is insufficient is greater than the amount of electric power to be received, then information processor 110 may reduce the amount of consumed electric power by stopping supplying electric power to electric devices 150 to be controlled, instead of or concurrent with discharging storage batteries 130 designated as belonging to the discharging storage battery group.

If the amount of electric power to be supplied from an external source to the power distribution system by way of reverse power flow is notified and if the amount of excessive electric power is greater than the amount of electric power to be supplied by way of reverse power flow, or if the amount of electric power to be received from the power distribution system is notified and the amount of electric power that is insufficient is smaller than the amount of electric power to be received, then information processor 110 supplies any of electric devices 150 that have been shut down with electric power to operate them, thereby increasing the amount of consumed electric power.

The supply of electric power to electric devices 150 is controlled by, for example, inserting relays or the like into power supply lines of electric devices 150 and turning on and off the relays according to instructions from information processor 110.

With the energy system according to the present exemplary embodiment, storage batteries 130 and renewable power supplies 140 are controlled and the supply of electric power to electric devices 150 is controlled to provide the same advantages as those of the first exemplary embodiment and also to reduce the overall amount of electric power consumed by energy system 100. Furthermore, since the number of charging and discharging cycles of storage batteries 130 is made smaller than with the energy system according to the first exemplary embodiment by controlling the supply of electric power to electric devices 150, instead of by charging and discharging storage batteries 130, deterioration of storage batteries 130 is minimized.

Third Embodiment

Figure 7:
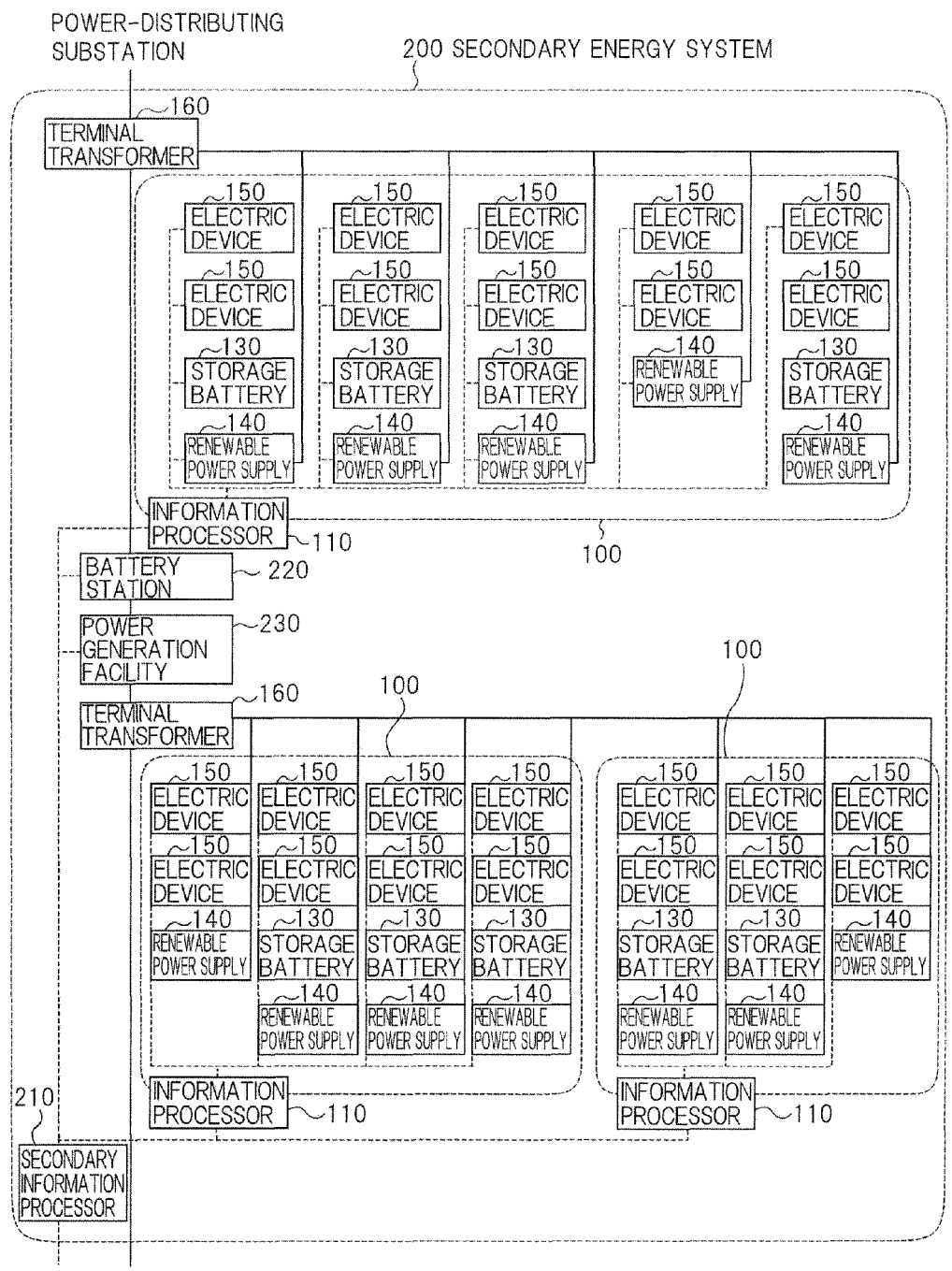
FIG. 7 is a block diagram of a configurational example of an energy system according to a third exemplary embodiment of the present invention.

FIG. 7 is a block diagram of a configurational example of an energy system according to a third exemplary embodiment of the present invention.

As shown in FIG. 7, the energy system according to the third exemplary embodiment includes a plurality of energy systems (hereinafter referred to as "primary energy systems") 100 each according to the first exemplary embodiment or the second exemplary embodiment, and secondary energy system 200 for controlling primary energy systems 100 in their entirety.

Secondary energy system 200 has secondary information processor 210 for controlling the amounts of electric power consumed by respective primary energy systems 100. Secondary energy system 200 and information processors (hereinafter referred to as "primary information processors") 110 of respective primary energy systems 100 are connected to each other by communication lines that send and receive information. As with primary information processors 110, secondary information processor 210 may be implemented by a computer as shown in FIG. 2. Power generation facility 230 having a large power generating capability such as a wind power generator and battery station 220 may be linked to secondary energy system 200.

Primary information processors 110 according to the present exemplary embodiment operate according to a control command (hereinafter referred to as "power flow control command") sent from secondary information processor 210 to control the sum of the amounts of supplied electric power and the sum of the amounts of consumed electric power in primary energy systems 100 that are controlled by primary information processors 110. The power flow control command is a command for notifying the amount of electric power that primary energy systems 100 supply to the power distribution system by way of reverse power flow, or for notifying the amount of electric power that primary energy systems 100 receive from the power distribution system. Primary information processors 110 regulate the sum of the amounts of supplied electric power and the sum of the amounts of consumed electric power in their own systems so as to be able to supply the notified amount of electric power to the power distribution system or to receive the notified amount of electric power from the power distribution system. The power flow control command is sent from secondary information processor 210 to each primary information processor 110 at certain time intervals or when the notified content changes.

Depending on the sum of the amounts of supplied electric power, the sum of the amounts of consumed electric power, and the electric power demand-supply adjusting capability of each primary energy system 100, secondary information processor 210 determines the amount of electric power consumed in each primary energy system 100, and regulates the overall electric power demand-supply balance of secondary energy system 200 to thereby stabilize the distributed voltage of the power distribution system.

FIG. 7 shows the energy system in two layers by way of example. However, it is possible to construct a hierarchical energy system in more layers, as shown in FIG. 8.

Figure 8:
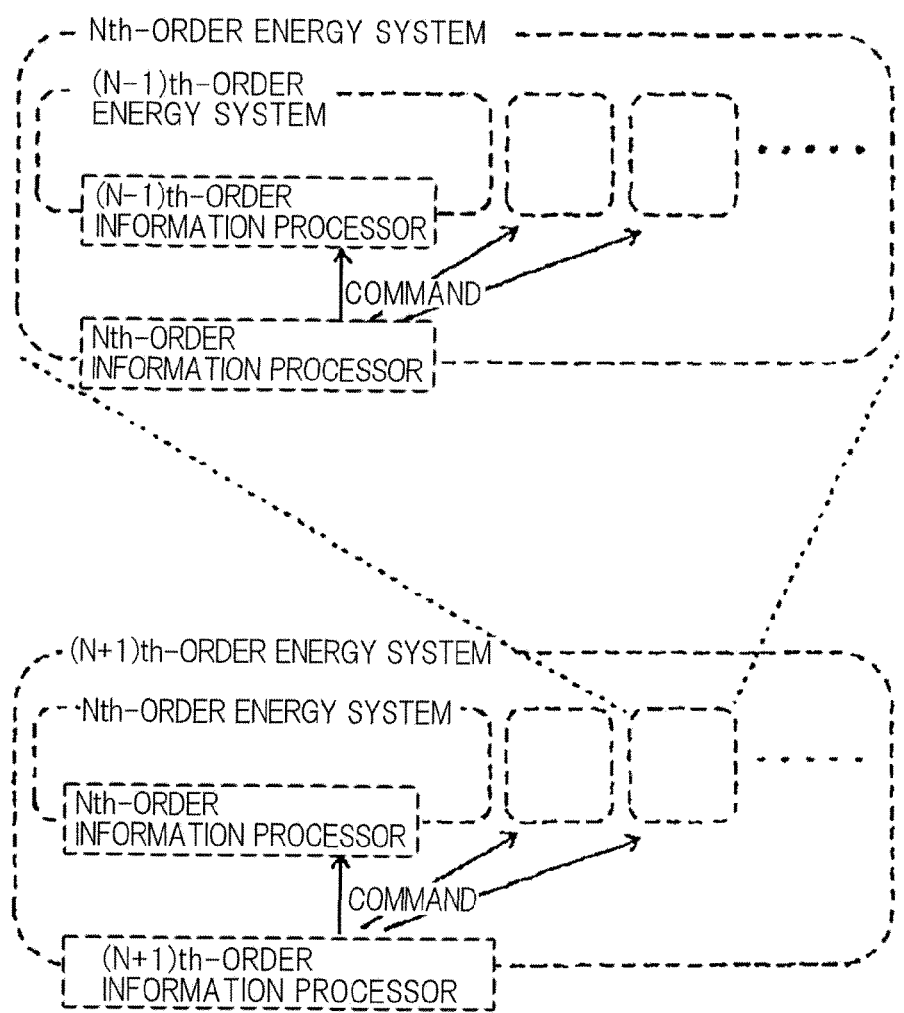
FIG. 8 is a block diagram of another configurational example of the energy system according to the third exemplary embodiment of the present invention.

The energy system shown in FIG. 8 is of a configuration wherein a plurality of (N−1)th-order (N is a positive integer) energy systems is managed by a higher-level Nth-order energy system, and a plurality of Nth-order energy systems are managed by a higher-level (N+1)th-order energy system. Each (N−1)th-order energy system includes an (N−1)th-order information processor, each Nth-order energy system includes an Nth-order information processor, and the (N+1)th-order energy system includes an (N+1)th-order information processor.

The Nth-order information processors and the (N−1)th-order information processors are connected by communication lines, and the (N+1)th-order information processor and the Nth-order information processors are connected by communication lines.

According to a specific example of the energy system shown in FIG. 8, primary energy systems are constructed in association with a plurality of respective electric power users connected to terminal transformers 160, and secondary energy systems are constructed in association with respective power distribution lines which deliver electric power from a power-distributing substation. Tertiary energy systems are constructed in association with respective transformers of the power-distributing substation, and quartic energy systems are constructed in association with respective primary substations.

With the energy system shown in FIG. 8, each Nth-order energy system can be regarded as a single power distribution facility having renewable power supplies 140 and storage batteries 130 controlled by (N+1)th-order information processors, and each (N−1)th-order energy system can be regarded as a power distribution facility having renewable power supplies 140 and storage batteries 130 controlled by Nth-order information processors. In other words, the N(N+1)th-order information processors can control electric power supplied from the power distribution system to the (N−1)(N)th-order energy systems, and electric power supplied from the (N−1)(N)th-order energy systems to the power distribution system.

With the energy system according to the third exemplary embodiment, since the amounts of supplied electric power and the amounts of consumed electric power can be regulated in each layer, it is possible to prevent system devices of an overall electric power system from suffering undue overcapacity, and the electric power demand-supply balance is made more stable.

The energy system according to the present exemplary embodiment is effective for solving the problem of system destabilization due to the introduction of renewable power supplies such as solar power generation facilities or the like, as described below.

The problem of distributed voltage destabilization can be solved as follows:

In residential areas, for example, on weekdays, the distributed voltage is higher in daytime owing to low demands than in nighttime. If solar cells are added, the distributed voltage in daytime further rises, possibly out of the appropriate range. In this case, secondary information processor 210 can control the direction and rate of electric power flowing from secondary information processor 210 to each terminal transformer 160 thereby preventing the distributed voltage from falling out of the appropriate range. Secondary information processor 210 monitors the lower voltages of terminal transformers 160 connected to one feeder line. If secondary information processor 210 detects a voltage increase out of the appropriate range, then secondary information processor 210 outputs a command to increase the amount of consumed electric power in nearby primary energy system 100 to primary information processor 110 that manages nearby primary energy system 100. If secondary information processor 210 detects a voltage drop out of the appropriate range, then secondary information processor 210 outputs a command to reduce the amount of consumed electric power in nearby primary energy system 100, thereby bringing the distributed voltage into the appropriate range. Such an algorithm includes a process of giving a command for increasing or reducing the amount of consumed electric power to different primary information processors 110 connected to one feeder line and transferring electric power from the storage batteries of certain primary energy system 100 to the storage batteries of different primary energy system 100 to thereby change the voltage distribution on the feeder line.

The problem of supply-demand imbalance is addressed as follows: Inasmuch as the energy system in any desired layer according to the third exemplary embodiment is capable of controlling a lower-level energy system group, as if it is a storage battery group, the direction and rate of electric power are controlled according to a command from a thermal power station or the like to thereby keep the frequency at an appropriate value.

The present exemplary embodiment is also effective for solving other problems than the problem of system destabilization, as described below:

The faults of system devices can easily be resolved. In any layer of the system, the capacities of electric wires and devices, such as transformers, etc., are limited. If a possibility of overcapacity arises, then a command is issued to an appropriate information processor for increasing or reducing the amount of consumed electric power in an energy system that is managed by the information processor, thereby avoiding overcapacity. For example, if current flowing through a certain system device is likely to exceed the limited capacity of the system device due to reverse power flow, then a command may be issued to increase the amount of consumed electric power in an energy system that is located downstream of the system device to prevent overcapacity. Thus, the introduction of renewable power supplies can be carried on without the need for strengthening facilities such as electric wires, transformers, etc.

Another merit is that widespread use of renewable power supplies can be promoted by making it easy to link them to the power system. As the number of introduced solar power generation facilities increases in the future, electric power users who want to have solar power generation facilities installed in their premises are expected to bear increased costs according to the background art because they need to go through complex procedures such as a request for strengthening facilities in the power system, have to pay a higher electricity bill due to the cost required to strengthen the facilities in the power system, or are required to install a storage battery having a relatively large capacity. With the energy system according to the present exemplary embodiment, however, since the facilities in the power system do not need to be strengthened, electric power users can have solar power generation facilities easily installed on their premises, do not have to pay a higher electricity bill, and may install a storage battery having a relatively small capacity. Consequently, the cost that the electric power users have to bear is minimized.

Since the energy system according to the present invention is effective for reducing the required capacities of the storage battery and additionally allows the storage batteries to be installed in distributed locations, the capacities of the individual storage batteries are reduced, and any danger caused if the storage batteries fail to operate is minimized, providing another merit of additional safety than if the storage batteries are in a centralized area.

The distributed installation of the storage batteries is considered to be disadvantageous in that it makes maintenance of the storage batteries more difficult to perform than the centralized installation of the storage batteries. However, since the states of the respective storage batteries are monitored by the primary information processors, it is possible to get in touch with a maintenance provider in the event that a failure in the storage batteries is discovered. Therefore, the energy system according to the present invention is effective for reducing the disadvantage of the distributed installation of the storage batteries.

The present invention has been described above in reference to the exemplary embodiments. However, the present invention is not limited to the above exemplary embodiments. Rather, various changes that can be understood by those skilled in the art as within the scope of the invention may be made to the arrangements and details of the present invention.

The present application is based upon and claims the benefit of priority from Japanese patent application No. 2009-181467, filed on Aug. 4, 2009 and Japanese patent application No. 2009-285164, filed on Dec. 16, 2009, the disclosure of which is incorporated herein in its entirety by reference.

The invention claimed is:

1. An energy system that includes a plurality of storage batteries and an information processor, wherein:
the plurality of storage batteries supply stored electric power to an electric device, each of said storage batteries being individually set to a maximum SOC representing a charging limit and a minimum SOC representing a discharging limit, each of said storage batteries being chargeable and dischargeable under the control of an external device and being capable of measuring SOC values; and
the information processor controls charging and discharging processes of said storage batteries individually to keep said storage batteries charged until SOC values acquired from said storage batteries reach said maximum SOC when said storage batteries are charged and to keep said storage batteries discharged until SOC values acquired from said storage batteries reach said minimum SOC when said storage batteries are discharged,
wherein said information processor:
individually establishes, for each of said storage batteries, a charging-stop SOC, which serves as an index for stopping the charging process, and which is lower than said maximum SOC, or a charging-stop ratio within a usable SOC range;
controls the charging processes of said storage batteries individually to keep said storage batteries charged until SOC values acquired from said storage batteries reach said charging-stop SOC or said charging-stop ratio when said storage batteries are charged; and
said information processor sets said charging-stop SOC and said charging-stop ratio based on the amounts of electric power consumed in said energy system and based on the instructions for reverse power flow to a power distribution system and charging instructions to said storage batteries.

2. An information processor for controlling an energy system that includes a plurality of storage batteries and an information processor, wherein
the plurality of storage batteries supply stored electric power to an electric device, each of said storage batteries being individually set to a maximum SOC representing a charging limit and a minimum SOC representing a discharging limit, each of said storage batteries being chargeable and dischargeable under the control of an external device and being capable of measuring SOC values, and
wherein said information processor comprises:
a processor that controls charging and discharging processes of said storage batteries individually to keep said storage batteries charged until SOC values acquired from said storage batteries reach said maximum SOC when said storage batteries are charged and to keep said storage batteries discharged until SOC values acquired from said storage batteries reach said minimum SOC when said storage batteries are discharged, and wherein said processor:
  individually establishes, for each of said storage batteries, a charging-stop SOC, which serves as an index for stopping the charging process, and which is lower than said maximum SOC, or a charging-stop ratio within a usable SOC range;
  controls the charging processes of said storage batteries individually to keep said storage batteries charged until SOC values acquired from said storage batteries reach said charging-stop SOC or said charging-stop ratio when said storage batteries are charged; and
  said information processor sets said charging-stop SOC and said charging-stop ratio based on the amounts of electric power consumed in said energy system and based on the instructions for reverse power flow to a power distribution system and charging instructions to said storage batteries.

3. The energy system according to claim 1, wherein either a renewable power supply or said storage batteries are installed in association with an electric power user who has said electric device.

4. The energy system according to claim 1, wherein said information processor:
  designates storage batteries which have reached said minimum SOC as belonging to a charging storage battery group, and designates storage batteries which have reached said maximum SOC, said charging-stop SOC, or said charging-stop ratio as belonging to a discharging storage battery group;
  wherein if the amount of electric power supplied by a renewable power supply is greater than the amount of electric power consumed by said electric device, said information processor carries out at least one process from among a process of supplying the generated electric power to a power distribution system by way of reverse power flow, a process of charging the storage batteries designated as belonging to said charging storage battery group, and a process of reducing the amount of electric power generated by said renewable power supply; and
  wherein if the amount of electric power supplied by said renewable power supply is smaller than the amount of electric power consumed by said electric device, said information processor carries out at least one process from among a process of receiving electric power from the power distribution system, a process of increasing the amount of electric power generated by said renewable power supply, and a process of discharging the storage batteries designated as belonging to said discharging storage battery group.

5. The energy system according to claim 4, wherein said electric device comprises a device which can be temporarily shut down under the control of the external device; and
  said information processor stops supplying electric power to said electric device if the amount of electric power supplied by said renewable power supply is smaller than the amount of electric power consumed by said electric device, and supplies electric power to said electric device to operate the electric device if the amount of electric power supplied by said renewable power supply is greater than the amount of electric power consumed by said electric device.

6. The energy system according to claim 1, wherein:
  if an amount of electric power to be supplied to said power distribution system by way of reverse power flow is notified by the external device, said information processor compares the amount of electric power to be supplied to said power distribution system by way of reverse power flow with excessive electric power as the difference produced by subtracting the sum of amounts of consumed electric power from the sum of amounts of supplied electric power in the energy system;
  wherein if the amount of said excessive electric power is greater than the amount of electric power to be supplied to said power distribution system by way of reverse power flow, said information processor carries out at least one process from among a process of charging the storage batteries designated as belonging to said charging storage battery group and a process of reducing the amount of electric power generated by a renewable power supply; and
  wherein if the amount of said excessive electric power is smaller than the amount of electric power to be supplied to said power distribution system by way of reverse power flow, said information processor carries out at least one process from among a process of increasing the amount of electric power generated by said renewable power supply and a process of discharging the storage batteries designated as belonging to said discharging storage battery group.

7. The energy system according to claim 1, wherein:
  if an amount of electric power to be received from the power distribution system is notified by the external device, said information processor compares the amount of electric power to be received from the power distribution system with the amount of electric power that is insufficient as the difference produced by subtracting the sum of amounts of supplied electric power from the sum of amounts of consumed electric power in the energy system;
  wherein if the amount of said lacking electric power is greater than the amount of electric power to be received from the power distribution system, said information processor carries out at least one process from among a process of increasing the amount of electric power generated by a renewable power supply and a process of discharging the storage batteries designated as belonging to said discharging storage battery group; and
  wherein if the amount of said electric power that is insufficient is smaller than the amount of electric power to be received from the power distribution system, said information processor carries out at least one process from among a process of charging the storage batteries designated as belonging to said charging storage battery group and a process of reducing the amount of electric power generated by said renewable power supply.

8. The energy system according to claim 1, wherein said storage batteries include a vehicular storage battery.

9. A hierarchical energy system comprising:
  a plurality of energy systems each according to claim 1; and
  a secondary information processor which notifies amounts of electric power consumed by the energy systems controlled by the information processors thereof, to the information processors included in the respective energy systems.

* * * * *